(12) United States Patent
Duan et al.

(10) Patent No.: US 7,808,952 B2
(45) Date of Patent: Oct. 5, 2010

(54) RATE ADAPTATION OF WIRELESS COMMUNICATION CHANNELS

(75) Inventors: Long L. Duan, San Diego, CA (US); Rath Vannithamby, San Diego, CA (US); Wanshi Chen, San Diego, CA (US); Reza Shahidi, Stockholm (SE); Alpaslan Gence Savas, San Diego, CA (US); Joakim Hulten, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1882 days.

(21) Appl. No.: 10/865,154

(22) Filed: Jun. 10, 2004

(65) Prior Publication Data
US 2005/0113106 A1    May 26, 2005

Related U.S. Application Data

(63) Continuation-in-part of application No. 10/721,951, filed on Nov. 25, 2003.

(51) Int. Cl.
*H04B 7/216* (2006.01)

(52) U.S. Cl. .................. 370/335; 370/468; 370/319; 370/329; 455/452.1; 455/452.2; 455/450

(58) Field of Classification Search ................ 370/335, 370/468, 319, 329, 395, 252; 455/452.1, 455/452.2, 450, 464, 509, 9, 522
See application file for complete search history.

(56) References Cited

U.S. PATENT DOCUMENTS

| | | | |
|---|---|---|---|
| 5,070,536 A | | 12/1991 | Mahany et al. |
| 5,978,380 A | * | 11/1999 | Kobayashi et al. .......... 370/410 |
| 6,163,524 A | * | 12/2000 | Magnusson et al. ......... 370/208 |
| 6,219,343 B1 | * | 4/2001 | Honkasalo et al. .......... 370/335 |
| 6,236,866 B1 | * | 5/2001 | Meyer et al. ............. 455/562.1 |
| 6,865,393 B1 | * | 3/2005 | Baum et al. .............. 455/452.2 |
| 7,272,118 B1 | * | 9/2007 | Yarkosky .................... 370/328 |
| 2002/0082039 A1 | | 6/2002 | Ue et al. |
| 2003/0007456 A1 | | 1/2003 | Gupta et al. |
| 2003/0067897 A1 | * | 4/2003 | Black ......................... 370/335 |

(Continued)

FOREIGN PATENT DOCUMENTS

EP    1043902 A2 * 10/2000

(Continued)

*Primary Examiner*—Minh D Dao
(74) *Attorney, Agent, or Firm*—Coats & Bennett, P.L.L.C.

(57) ABSTRACT

A wireless communication network manages variable data rate communication channels using both short-term data rate adaptation and longer-term resource allocation adjustment. For example, an exemplary base station system may track the actual transmit power being used to transmit a given communication channel on a per frame basis, or faster, and use that tracked value to infer changing channel conditions, e.g., for a given current data rate, higher power indicates poorer channel conditions and lower power indicates better channel conditions. Additionally, or alternatively, channel quality information reported by a receiving mobile station can be used. Regardless, relatively fast data rate changes can be made responsive to monitoring the channel conditions, while retaining the communication resource allocation for the channel. Over the longer term, however, the allocation itself can be changed, e.g., increased or decreased, depending on whether the channel is being efficiently utilized.

32 Claims, 7 Drawing Sheets

U.S. PATENT DOCUMENTS

| | | | |
|---|---|---|---|
| 2004/0058685 A1* | 3/2004 | Raitola | 455/450 |
| 2005/0107091 A1* | 5/2005 | Vannithamby et al. | 455/453 |
| 2005/0107107 A1* | 5/2005 | Shahidi et al. | 455/522 |
| 2006/0211375 A1* | 9/2006 | Chang et al. | 455/67.11 |

FOREIGN PATENT DOCUMENTS

| | | |
|---|---|---|
| EP | 1 309 106 | 5/2003 |
| WO | WO 99/20016 | 4/1999 |

* cited by examiner

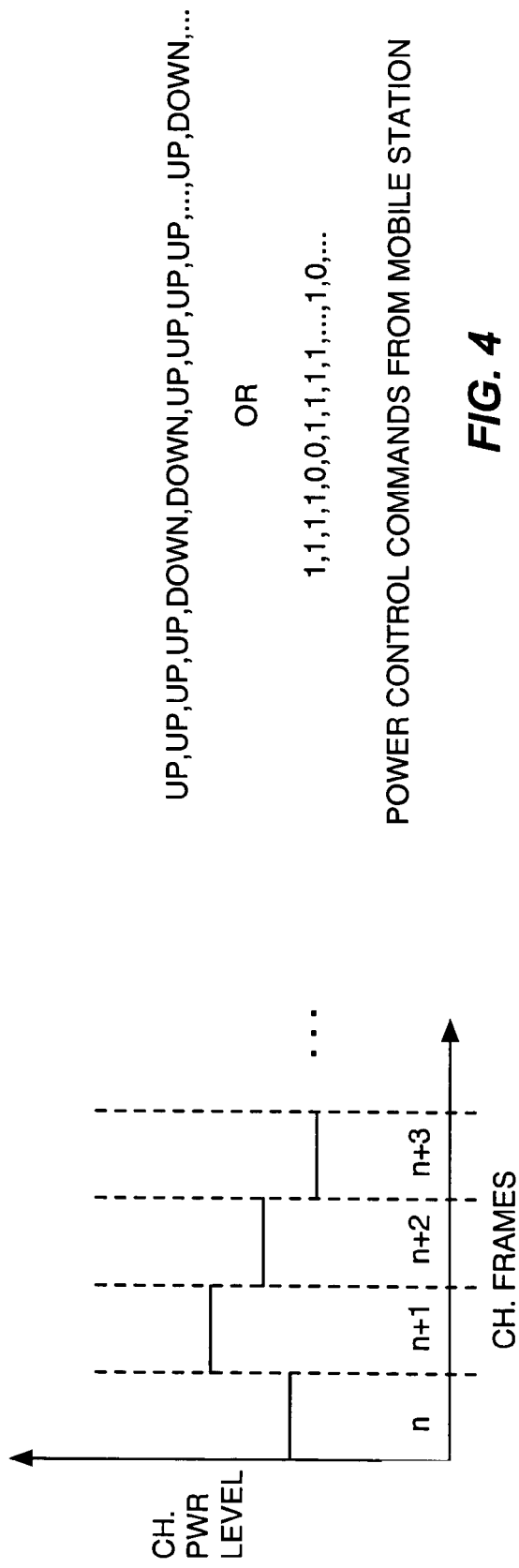
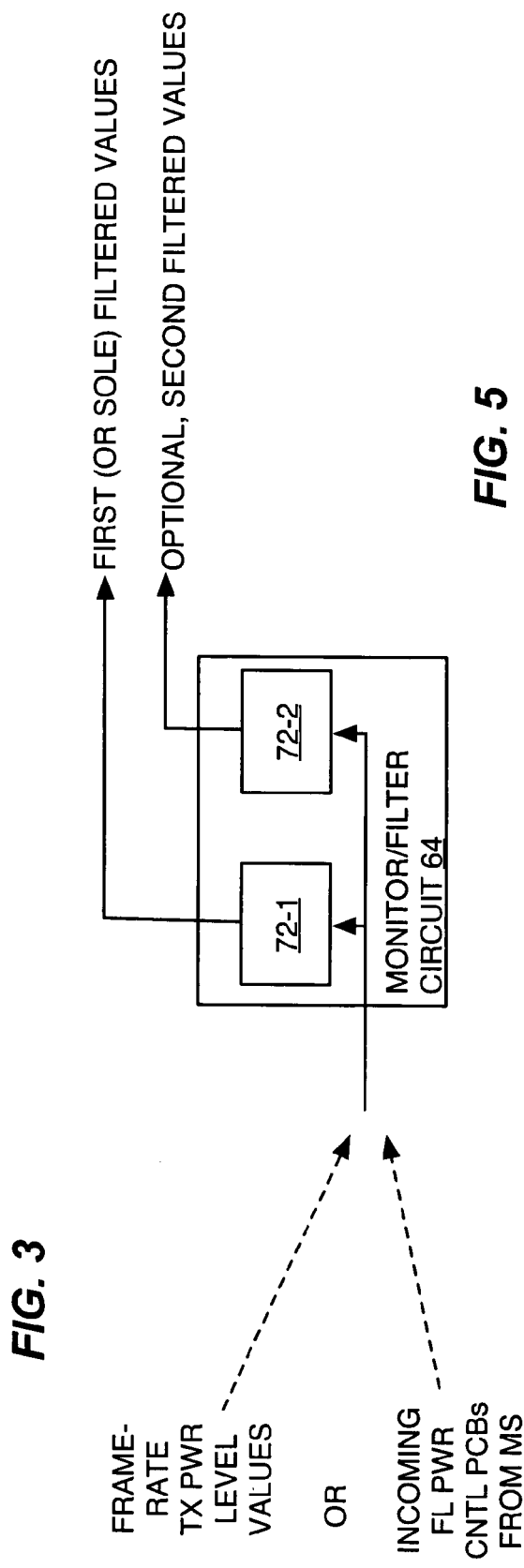
FIG. 3
FIG. 4
FIG. 5

RATE ADAPTATION OF WIRELESS COMMUNICATION CHANNELS

RELATED APPLICATIONS

The present application is a Continuation-In-Part of U.S. patent application Ser. No. 10/721,951, which was filed on 25 Nov. 2003, and entitled "Power-Based Rate Adaptation of Wireless Communication Channels." This priority application, which is co-pending and commonly assigned with the instant application, expressly is incorporated herein by reference in its entirety.

BACKGROUND OF THE INVENTION

The present invention generally relates to wireless communication networks, and particularly relates to adaptive rate control of communication channels in such networks.

Evolving wireless communication networks, such as those based on the IS-2000 family of standards, offer a wide range of services including voice, data (web, email, etc.), and streaming media services. Differing applications and Quality of Service (QoS) requirements result in individual data users having differing data rate needs. IS-2000 networks typically serve individual data users on the forward link using forward link fundamental channels (F-FCHs) that support a maximum channel data rate of 9.6 kpbs. If that data rate is insufficient to meet the service requirements of a particular data user, the network assigns a forward supplemental channel (F-SCH) in conjunction with that user's F-FCH. F-SCHs are configured to have data rates expressed as a multiple of the F-FCH data rate, and thus a data user may be assigned a F-SCH rate of 1×, 2×, 4×, etc., depending on the particular service needs of that user.

Typically, the assignment of a F-SCH to a particular data user is triggered by an excess data buffer size, i.e., the queue for incoming data to be transmitted to the user is too large, or is triggered by the rate of the incoming data. Selection of a F-SCH initial data rate may be based on the predicted data throughput to the data user, or may be based on other considerations. Regardless, once the F-SCH is assigned, conventional networks either leave the initially configured rate unchanged for the duration of the assignment, or make relatively infrequent rate changes based on, for example, changes in the incoming forward link traffic (i.e., packet size or rate). In theory, the network could use frame error rate (FER) information fed back from the data user to make rate adjustments, but that would not allow timely rate adjustments because relatively long periods of time, e.g., a hundred or more received frames, are required to develop statistically accurate FER information.

Overall network performance and utilization efficiency suffer because of the inability to intelligently adjust F-SCH data rates and corresponding channel resource allocations. That is, where the data rate of a given F-SCH is too high given the current radio conditions of the data user the channel is assigned to, the effective data rate of the channel is lowered because of the high incidence of reception errors and the transmit power allocated for the inappropriately high data rate is at least partially wasted. Of course, the converse is true, wherein the network misses opportunities to make timely increases in F-SCH data rates responsive to improving radio conditions for particular data users.

Further, communication resources typically are assigned to support a targeted data rate for a given communication channel. If the actual usage of the channel is below the potential throughput possible with the assigned resources, at least a portion of those assigned resources are, in effect, being "wasted." Thus, the utilization efficiency of the network can suffer significantly if communication channel resource allocations are not managed with respect to the actual needs of the channel users.

These circumstances are not limited to IS-2000 networks. Indeed, the potential for such inefficiencies arise in any communication network wherein rate-adjustable channels are assigned to users and managed without benefit of direct rate control feedback from the users.

SUMMARY OF THE INVENTION

The present invention comprises a method and apparatus for managing variable data rate communication channels in a wireless communication network. By way of non-limiting example, the communication channels of interest may comprise forward link supplemental channels (F-SCHs) in a cdma20000 network used to transmit packet data from a base station to one or more mobile stations. Of course, those skilled in the art will appreciate that the present invention applies directly to other types of networks as well, such as those based on Wideband CDMA (WCDMA) standards.

Broadly, the present invention combines channel data rate adjustment with channel resource allocation management. For a given channel resource allocation, e.g., given power and spreading code allocations, the channel rate may be set as a function of varying channel conditions within the limits imposed by the resource allocation. Further, to ensure efficient utilization of resources, that channel resource allocation may be changed from time to time, depending on whether the channel is or is not being well utilized, e.g., whether the channel is being over-utilized or underutilized.

Thus, in an exemplary embodiment, the present invention comprises, in a wireless communication network, a method of managing a communication channel having a variable data rate based on making short-term data rate adjustments for the communication channel based on monitoring changing channel conditions, and making long-term communication resource allocation adjustments for the communication channel based on monitoring channel utilization. Advantageously, a given channel resource allocation is maintained in the short term to thereby permit data rate adjustments to be made upward or downward within the resource allocation limits as a function of changing channel conditions. For example, the channel data rate may be dropped responsive to momentary fading and then quickly restored to its previous setting once channel conditions improve.

However, the present invention further recognizes that maintaining a given communication channel resource allocation over the long term may lead to resource utilization inefficiency. For example, if the actual average data throughput on the channel is substantially below the throughput achievable with the current resource allocation. In such cases, an exemplary channel management method adjusts the resource allocation, such as by reducing the amount of transmit power and/or spreading code resources set aside for the channel, and makes corresponding adjustments to the channel data rate. The particular processes undertaken to adjust resources and to adjust the data rate may be dependent on the particular channel type. For example, management of a supplemental channel in a cdma2000-based network may entail changing the channel's radio configuration, tearing the channel down and reestablishing it at a different data rate and/or with a different resource allocation, etc.

In an exemplary implementation, the currently allocated resources are maintained at least over a given interval, and the channel data rate is adjusted one or more times over that interval, within the limits of the current resource allocation, as a function of channel condition. Channel conditions may be monitored by evaluating the average actual transmit power being used to transmit the channel of interest relative to a minimum and maximum transmit power allocations as defined by the current communication resource allocation, for example. If the average power is close to the maximum allocation, the current data rate may be considered too high for current channel conditions and thus may be lowered, such as by selecting a lower rate from a defined set of possible data rates. Conversely, if the average power is close to minimum allocation, the current data rate may be considered too low for current channel conditions, and thus may be raised. Additionally, or alternatively, channel conditions may be monitored based on receiving channel quality information from mobile stations receiving data on the communication channel(s) being managed. For example, Channel Quality Indicators, as received from the mobile stations, may be used, and may be particularly helpful with respect to monitoring rapidly changing channel conditions given their typically high feedback rate.

Thus, an exemplary base station for use in a wireless communication network comprises a control circuit including one or more processing circuits configured to initially allocate communication resources to the communication channel in accordance with an initial data rate set for the communication channel, change the data rate responsive to monitoring channel conditions while retaining the allocated communication resources, and re-allocate communication resources to the communication channel responsive to monitoring channel utilization. The control circuit may be configured to return any communication resources freed by the re-allocation to one or more available resource pools for use as needed in supporting other communication channels, and may be configured to monitor channel utilization based on a first time scale, and to monitor channel conditions based on a second, faster time scale.

Of course, the present invention is not limited by the foregoing details. Those skilled in the art will recognize additional features and advantages upon reading the following detailed description, and upon viewing the accompanying drawings.

BRIEF DESCRIPTION OF THE DRAWINGS

FIG. 3 is a diagram of typical per-frame transmit power variations for a given communication channel of interest.

FIG. 4 is diagram of typical forward link power control commands as might be returned to a network radio base station from a particular mobile station.

FIG. 5 is a diagram of exemplary filters to transmit power information for rate adaptation monitoring.

DETAILED DESCRIPTION OF THE INVENTION

Figure 1:
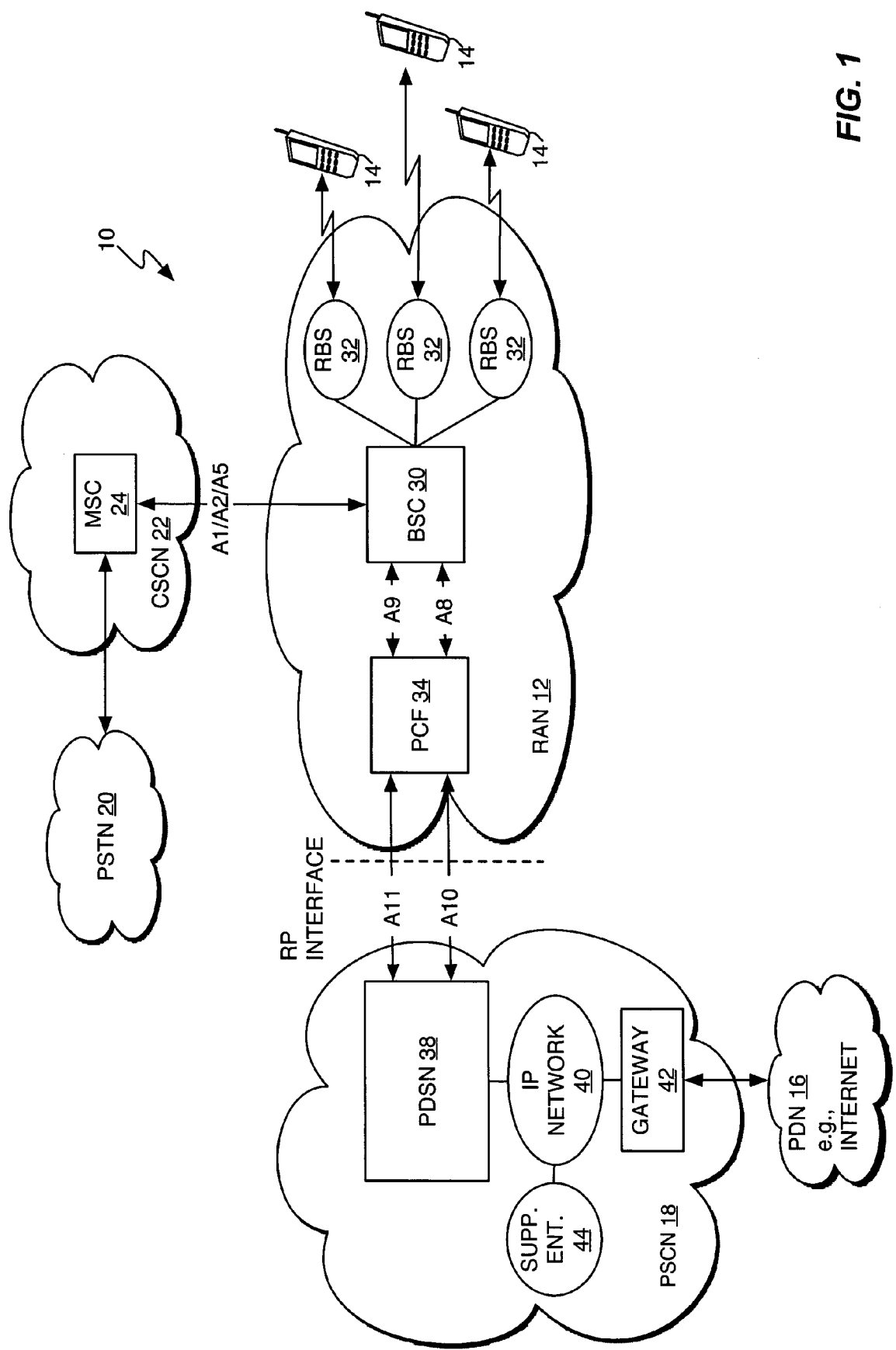
FIG. 1 is a diagram of an exemplary wireless communication network according to an embodiment of the present invention.

FIG. 1 illustrates an exemplary wireless communication network 10 that generally may be configured according to known communication standards, and specifically may be configured in accordance with the present invention. For example, network 10 may comprise a cdma2000 network based on IS-2000/2001 standards. It should be understood that network 10 also could be configured according to other standards as needed or desired, including WCDMA standards, for example.

As illustrated, network 10 comprises a Radio Access Network (RAN) 12 that supports wireless communication between mobile stations 14 and one or more Public Data Networks (PDNs) 16, such as the Internet, based on its Radio-Packet (RP) interface with Packet Switched Core Network (PSCN) 18. RAN 12 also may be configured to carry voice and other circuit-switched communication traffic between the mobile stations 14 and users of the Public Switched Telephone Network (PSTN) 20 based on its traffic and signaling interfaces with Circuit-Switched Core Network (CSCN) 22, which typically includes a Mobile Switching Center (MSC) 24 to handle voice call setup/teardown, etc.

In any case, an exemplary RAN 12 comprises one or more Base Station Controllers (BSCs) 30, each one associated with one or more Radio Base Stations (RBSs) 32. A Packet Control Function (PCF) 34 is associated (or integrated) with each BSC 30, and provides an interface to a Packet Data Serving Node (PDSN) 38 in the PSCN 18. PDSN 38 carries packet data traffic for mobile stations 14, and may be coupled through a local (private) IP network 40 to a gateway router 42 that provides access to the Internet at large, or to one or more other PDNs 16. The PSCN 18 may comprise various other entities 44, such as Home Agents and Foreign Agents to manage packet data mobility functions.

While potentially helpful in terms of understanding exemplary network operations in a broad sense, details of the CSCN 22 and PSCN 18 are not required for understanding the present invention, which generally concerns operations and equipment in RAN 12, and, in particular, concerns RBSs 32 and BSCs 30.

Figure 2:
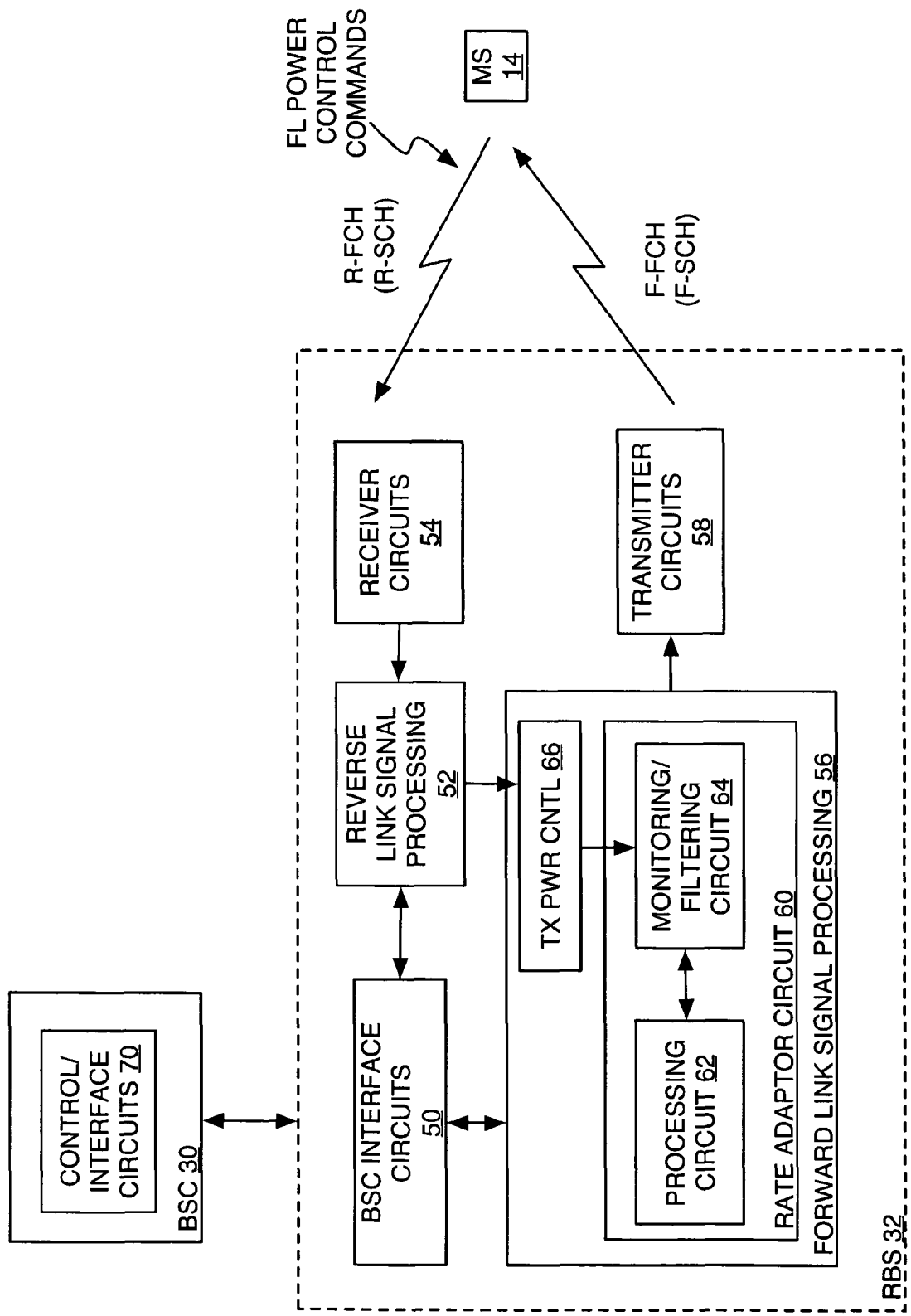
FIG. 2 is a diagram of an exemplary radio base station.

Turning, then, to exemplary details for an RBS 32 configured according to one or more embodiments of the present invention, FIG. 2 illustrates that RBS 32 functionally comprises BSC interface circuits 50, reverse link signal processing circuits 52 and associated receiver circuits 54, forward link signal processing circuits 56 and associated transmitter circuits 58. Forward link signal processing circuits 56 comprise a rate adaptor circuit 60 that includes a processing circuit 62 and one or more monitoring/filtering circuits 64, which may be integrated with the processing circuit 62. A forward link (transmit) power control circuit 66 may be associated with, or included in, the forward link signal processing circuits 56.

These various functional elements can be implemented in hardware, software, or both, and the exemplary RBS 32 includes one or more microprocessor circuits, such as Digital Signal Processors (DSPs), and associated supporting circuits, such as memory, etc. As such, in an exemplary embodiment, the present invention, including rate adaptor circuit 60, is implemented at least in part as a computer program stored in memory for execution in one or more RBS microprocessor circuits.

RBS 32 supports wireless communication to and from individual ones of the mobile stations 14 by transmitting signals to the mobile stations 14 using one or more forward link channels and receiving signals from the mobile stations 14 using one or more reverse link channels. In an exemplary embodiment, each mobile station 14 is served using one or more dedicated (mobile-specific) forward and reverse link channels.

Power control loops on the forward and reverse links operate to maintain the forward and reverse link channel transmit powers substantially at, but preferably not higher than, the levels needed to achieve a desired received signal level quality at both the RBS 32 and at the mobile stations 14. For example, for a particular mobile station 14, the RBS 32 sends reverse link power control commands at a defined rate to the mobile station 14, and mobile station 14 moves its transmit power up or down according to the commands. Thus, if the RBS 32 is receiving the mobile station's reverse link signals below a targeted signal-to-noise ratio, it sends up commands to the mobile station and, conversely, if it is receiving the mobile station's signal above the targeted signal quality, it sends down commands. According to this scheme, then, the transmit power from the mobile station 14 moves up and down as needed to achieve the desired signal quality at the RBS 32.

Similarly, the mobile station 14 sends forward link power control commands, e.g., Power Control Bits or PCBs, to the RBS 32 that command the RBS 32 to increase or decrease its transmit power to the mobile station 14 according to a desired received signal quality at the mobile station 14. For example, the mobile station 14 may compute a target received signal quality and then send up or down power commands to RBS 32 as needed to maintain the received signal quality at or around that target. Along with this, the mobile station 14 may monitor a Frame Error Rate (FER) for data received from the RBS 32 and may raise or lower the received signal quality target depending on whether the FER is high or low.

Link power control of this nature generally is well understood by those skilled in the art, however, according to the present invention, transmit power information associated with such closed loop power control is used to make channel data rate adaptations. For example, in the context of F-SCHs in cdma2000 networks, the present invention may be used to provide dynamic rate adaptation for a given F-SCH based on the transmit power of that F-SCH. More broadly, the present invention provides a relatively fast, e.g., per transmit frame or better, methodology for performing channel rate adaptation based on transmit power information. According to a broad embodiment, a relatively high transmit power indicates that the channel data rate should be adapted downward and a relatively low transmit power indicates that the channel data rate should be adapted upward. As such, the present invention can be applied to essentially any communication channel that is rate adjustable. Such application may be particularly beneficial where the channel in question lacks an explicit rate control feedback mechanism keyed to received signal quality at the remote receiver.

As an example, FIG. 3 illustrates the changing transmit powers used by RBS 32 for the transmission of data to a particular mobile station 14 on a F-SCH assigned to that mobile station 14. In general, the transmit power required for a F-SCH depends on its configured data rate, the path loss on the forward link, and the interference at the remote receiver, i.e., at the targeted mobile station 14. Broadly, then, the required transmit power is a function of channel data rate and overall radio conditions. As shown in the illustration, the required transmit power varies over time—four frames are illustrated—as a function of changing radio conditions.

FIG. 4 illustrates a typical stream of up/down power control commands as might be sent by the mobile station 14 to the RBS 32 to control the forward link transmission power used by the RBS 32 to transmit to the mobile station 14. For example, the mobile station 14 commands the RBS 32 to increase its transmit power by sending up commands if the mobile station is experiencing too many errors in the data it receives from RBS 32. Conversely, as explained above, mobile station 14 sends down power control commands to RBS 32 if the mobile station 14 is receiving data at an error rate lower than the target. Of course, in normal operation, with fast fading and other dynamic variations in radio conditions, the power control commands streamed back to the RBS 32 from the mobile station 14 comprise an ever-changing mix of up and down power control commands. However, in general, the commands are predominantly up commands where the mobile station 14 is experiencing excessive received data errors, and the commands are predominantly down commands where the mobile station is experiencing relatively few data errors.

FIG. 5 illustrates an exemplary approach to transmit power information monitoring that may be adopted by the RBS 32 of FIG. 3 for rate adaptation of a particular forward link channel of interest, wherein the actual transmit power being used for the channel is monitored, or the incoming power control commands from the targeted mobile station are monitored. Thus, in a first exemplary embodiment, the rate adaptor circuit 60 dynamically adapts the data rate of a particular F-SCH up or down based on monitoring the actual transmit power being used to transmit on the channel. Alternatively, the rate adaptor circuit 60 dynamically adapts the rate based on the power control commands returned by the mobile station 14.

In either case, the monitor/filter circuits 64 may comprise one or more filter circuits 72. In an exemplary embodiment, the raw power data (either values corresponding to the transmit power or to the incoming stream of power control commands) is routed into a first filter 72-1 that is configured with a first filter time constant to effect a desired amount of filtering. Optionally, the data also is routed into a second filter 72-2 that is configured with a second filter time constant to effect a desired amount of smoothing. In one configuration, the first filter time constant is set less than the second filter time constant such that the first filtered values output by filter 72-1 more rapidly track changes in the pre-filtered data, while the second filtered values output by filter 72-2 exhibit a greater degree of smoothing.

It may be desirable, for example, to make downward rate adjustments more quickly than upward rate adjustments. Thus, downward rate adjustment decisions may be made based on monitoring the first filtered values relative to defined thresholds, and upward rate adjustments may be made based on monitoring the second filtered values relative to the same or different thresholds.

Figure 6:
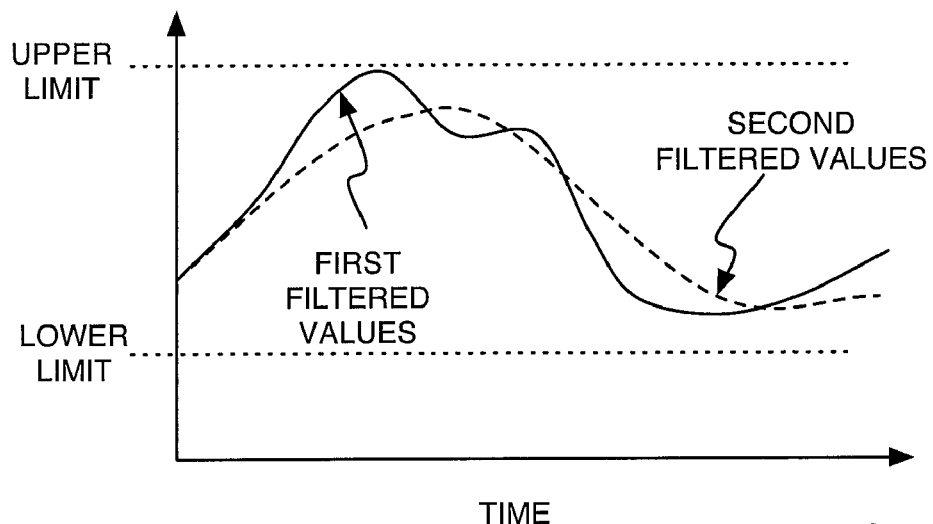
FIG. 6 is a diagram of first and second filtered values illustrating the use of different, e.g., fast and slow, filter time constants for rate adaptation monitoring.

FIG. 6 illustrates such an embodiment, and one sees that the second filtered values exhibit greater smoothing, i.e., a longer filter time constant, than the first filtered values. Further, one sees that both sets of filtered values change over time relative to defined upper and lower limits. If the filtered values are derived from the actual channel transmit power, then the upper and lower limits can be set at the minimum and maximum powers defined for the channel. Transmit power control circuits 66 that provide forward link transmit power for the individual communication channels can be configured to provide the rate adaptor circuit 60 with the transmit power information for any number of channels subject to rate adaptation according to the present invention.

If the filtered values used for rate adaptation are derived from the mobile station's power control commands, then the upper and lower limits can be set at percentage or fractional values. For example, if a "0" defines a down power command and a "1" defines an up power command, then the filtered values will range from a minimum of zero (all "0s" received) to a maximum of one (all "1s" received). A value of about 0.5 would represent a more or less even mix of up and down commands. Thus, the lower limit could be set at 0.25 and the upper limit could be set at 0.75. The lower limit would be reached if the larger percentage of power control commands incoming from the mobile station 14 were down commands, and the upper limit would be reached if the larger percentage were up commands. Of course, those skilled in the art will recognize that these are merely example limits that can be changed as needed or desired.

Additionally, those skilled in the art will recognize the opportunity to vary the filtering process as needed or desired. In an exemplary embodiment, the filter characteristics may be configured to achieve a desired averaging response. Filter performance may be adjusted by configuring the number of transmit frames over which the transmit information is developed, i.e., the number of transmit frames over which the average is determined. In an exemplary embodiment, new transmit power information is available per 20 ms frame. Similarly, in embodiments that derive transmit power information from the incoming power control commands, filter performance can be adjusted by changing the number of commands that are averaged. Incoming power control commands are received at up to 800 Hz (every 1.25 ms), and averaging operations can be configured to balance smoothness with responsiveness.

Further, regardless of filter configuration, it may be desirable to "reset" filtering after a rate increase or decrease. Such filter resetting helps prevent false re-triggering of the rate adaptation method immediately after a rate change. As an example, the method may include resetting the transmit power information to half the last filtered power value determined prior to a rate decrease, or to double the last value determined prior to a rate increase. Of course, other reset values can be used and, if separate filters are used for triggering rate increases and decreases, reset operations may be tailored to each individual filter.

Figure 7:
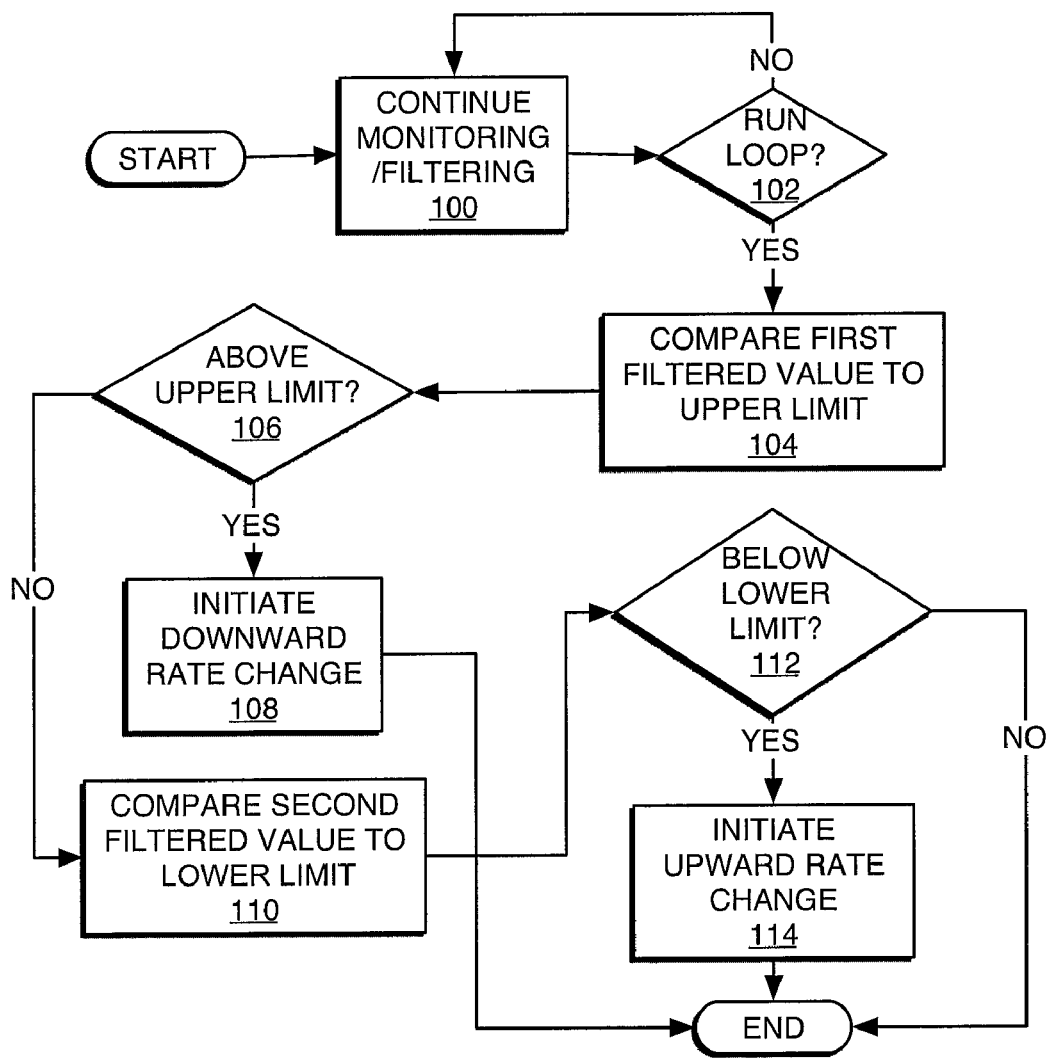
FIG. 7 is a diagram of exemplary processing logic for rate adaptation according to an embodiment of the present invention.

Regardless, FIG. 7 illustrates exemplary rate adaptation processing. In general, processing comprises ongoing transmit power information monitoring (Step 100) wherein the desired transmit power information is filtered (using one or more filters as needed or desired) for use in rate adaptation. Rate adaptation may be run at essentially any rate desired, depending on the availability of transmit power information. For example, in cdma2000 networks, frame transmit power data is available on a per frame rate, e.g., every twenty milliseconds. Thus, twenty milliseconds represent an exemplary rate adjustment interval for F-SCH rate adaptation. Power control commands returned from the mobile station 14 are available at up to 800 Hz, and even with filtering the use of these power control commands supports a per-frame or better rate adaptation interval.

Thus, if it is time for rate adaptation for a given channel or channels of interest (Step 102), the rate adaptor 60 compares the first filtered value against the upper limit (Step 104). If the first filtered value is above the upper limit (Step 106), rate adaptor 60 initiates a downward rate adjustment (Step 108). If not, the rate adaptor 60 compares the second filtered value to the lower limit (Step 110). If the second filtered value is below the lower limit (Step 112), the rate adaptor 60 initiates an upward rate adjustment (Step 114). If the first and second values are between the upper and lower limits, no rate adjustments are made. Processing ends with respect to the current rate adjustment interval, but it should be understood that monitoring can continue and that the above process can be repeated at the desired adjustment interval or as needed.

As an exemplary alternative to comparing filtered transmit power values to a lower power bound set relative to a current channel data rate, the rate adaptor 60 generally may compare the filtered value to a threshold derived from the power requirements of a higher data rate. For example, the filtered value may be compared to a threshold set relative to an upper power bound associated with the next higher data rate. By making that comparison, the rate adaptor 60 ensures that a sufficient power margin will exist to maintain the integrity of the call at the contemplated higher rate in consideration of normal power fluctuations. As an example, suppose that the current channel is at a rate 4× and the next higher rate is 8×. In determining whether to move from 4× to 8×, the rate adaptor 60 compares the filtered value to threshold associated with the maximum power defined for the 8× rate to determine whether to initiate the rate increase.

More generally, the rate adaptor 60 can determine whether to increase the data rate by making the comparison to a threshold that will ensure sufficient power adjustment range to maintain radio link quality at the contemplated higher rate. The comparison threshold thus should be set relative to the upper power bound defined for the contemplated data rate to allow for reasonable margin.

In initiating a rate adjustment, the rate adaptor circuit 60 may send a rate adjustment message to the BSC 30, or otherwise signal to the BSC 30 that a rate adjustment is needed. The control/interface circuits 70 of BSC 30 can be configured to respond to such signaling by sending an Extended Supplemental Channel Assignment Message (ESCAM) to the mobile station 14 to cancel the previous rate assignment of the mobile station's F-SCH and to inform the RBS 32 of the rate change so that it can reconfigure the rate accordingly.

Thus, in an exemplary embodiment directed to F-SCH rate adaptation in a cdma2000 network, RBS 32 can be configured to perform rate adaptation on any number of F-SCHs being supported by the RBS 32. For any of these channels, the RBS 32 initiates downward rate adjustments as needed in response to determining that the transmit power information for that channel indicates that a relatively higher power is required to support the current data rate of the channel. Conversely, the RBS 32 initiates upward rate adjustments as needed in response to determining that a relatively lower power is required to support the current data rate of the channel, or that the current average power is such that the next higher data rate could be supported with sufficient power margin. So configured, the RBS 32 uses transmit power information to infer whether a particular mobile station 14 is in relatively good or relatively bad radio conditions, and to make the correspondingly appropriate rate adaptation.

In conjunction with data rate adaptation, the present invention contemplates improvements in overall network utilization efficiency through a cooperative method wherein communication channel resource allocation adjustments are coordinated with communication channel data rate adjustments. With this combined approach to communication channel management, the data rate of a given communication channel can quickly be adjusted downward or upward as needed, within the limits imposed by a current channel resource allocation, to make data rate adjustment responsive to dynamic channel conditions, such as fading. In concert with this, but preferably on a slower basis, the network evaluates whether the allocated channel resources are being efficiently utilized, so that the channel's resource allocation can, if needed, be adjusted. Here, resource allocations can include both backhaul network resources and/or radio access network resources.

To understand at least some of the benefits of this two-pronged approach to communication channel management, it may be helpful to step through a simple example in the context of the F-SCH channel assigned to a given mobile station 14 (i.e., a given "user"). Assume that the initial channel assignment negotiated between the network and the user is for an 8× F-SCH. The supporting base station system (BSC 30 and RBS 32) allocates communication channel resources, e.g., forward link transmit power allocations and spreading code allocations, commensurate with the 8× data rate of the channel. As noted previously herein, the transmit power allocation may be defined by a minimum transmit power allocation and a maximum transmit power allocation, e.g., a two Watt floor and a five Watt ceiling.

If the user is in relatively good channel conditions, the average actual transmit power needed to deliver data to the user at the 8× data rate with an acceptable FER will be relatively low with respect to the allocated power ceiling. Indeed, the average actual transmit power may be at or near the allocated power floor.

However, assume for the moment that the average actual transmit power as monitored suddenly rises to the allocated power ceiling or near it. In accordance with the exemplary data rate adaptation described earlier herein, the data rate of the channel temporarily can be dropped to a lower rate, e.g., a 4× data rate. When the channel conditions improve, which may be a very short time later, e.g., a few transmit frames, the average actual transmit power will drop back to a lower value and the data rate adaptation algorithm preferably will restore the data rate at least to the prior 8× value.

To make quick restoration of the prior data rate possible, i.e., to avoid the delay and signaling overhead associated with allocating new communication resources to move the channel back to the 8× data rate, a preferred embodiment of the data rate adaptation method retains the currently allocated communication channel resources. In other words, the resources that were being used to support the 8× data rate generally are not released when the data rate is dropped to 4×, but rather remain allocated to the channel in expectation that the channel conditions will improve in short order and that the higher rate will be restored.

While the retention of allocated resources over temporary changes in channel quality facilitates the quick adjustment of data rates up or down as needed, within the limits of the current resource allocation, the utilization efficiency of the network can suffer if the resource allocations for each variable data rate channel are not managed in such a way as to ensure that users are, in general, allocated no more resources than actually needed by them. Put simply, the resources needed to support a 16× or other high data rate channel effectively are wasted if the data throughput requirements of the user assigned to that channel could be supported with a lower rate channel that required less communication resources.

Thus, in an exemplary embodiment, the present invention comprises making short-term data rate adjustments for a given communication channel based on monitoring changing channel conditions, and making long-term communication resource allocation adjustments for the communication channel based on monitoring channel utilization. In an exemplary implementation, base station processing thus may comprise changing a communication resource allocation for the communication channel responsive to monitoring a channel utilization of the communication channel, and, for a current communication resource allocation, changing a data rate of the communication channel responsive to monitoring channel conditions.

Exemplary channel condition monitoring may be based on relatively fast average transmit power monitoring, such as explained earlier herein. Such monitoring may be configured to provide updated monitoring values at least once per transmit frame, such as every 10 or 20 ms, for example. Alternatively, or additionally, channel condition monitoring may be based on receiving channel quality information from the mobile station 14 to which the communication channel is assigned. In other words, direct feedback from the mobile station 14 regarding the received signal strength and/or quality of the communication channel as its received by the mobile station 14 may be used to monitor channel conditions.

Such information may comprise, for example, the mobile station 14 transmitting Channel Quality Indicators (CQIs), which relate to the signal-to-noise-plus-interference ratio (SINR) of the received communication signal at the mobile station. CQI values may be sent by the mobile station at a fairly high rate, such as once every 1.25 ms or better. Thus, even where incoming CQI values are filtered to smooth them for improved data rate adaptation control response, the effective rate at which the prevailing channel conditions can be evaluated for purposes of rate adaptation is quite high.

Because exemplary resource allocation adjustments are made more slowly than the above data rate adaptations, the channel utilization monitoring used as the trigger for allocation adjustments can be based on any number of utilization indicators that may or may not be available at the same rate as channel condition information. For example, the exemplary base station may use a channel condition/usage report. In the context of managing a F-SCH, it may use F-SCH Rate Report Messages (FRRMs), for example, which may be generated for each F-SCH being supported by a given RBS 32. In other exemplary embodiments, one or both the BSC 30 and an associated RBS 32 directly or indirectly monitor the average data throughput for the communication channel of interest, such as by tracking the total data transmitted on the channel over a defined time interval. As a further example, packet queue length monitoring may be used.

If the measured throughput is small compared with a maximum throughput achievable with the currently allocated communication resources, the exemplary base station may adjust the current resource allocation for the channel downward, and may lower the data rate accordingly. Conversely, if the measured throughput is large with respect to the maximum throughput achievable, the exemplary base station may adjust the current resource allocation upward, and may increase the data rate accordingly, provided the channel condition report indicates a good radio environment. Throughput also may be assessed by, for example, comparing actual throughput with rate request feedback received for the communication channel. Regardless, adjusting the currently allocated resources may entail adding or subtracting resources as needed, or may entail releasing the currently allocated resources entirely, and then re-allocating new resources as needed to the channel.

Figure 8:
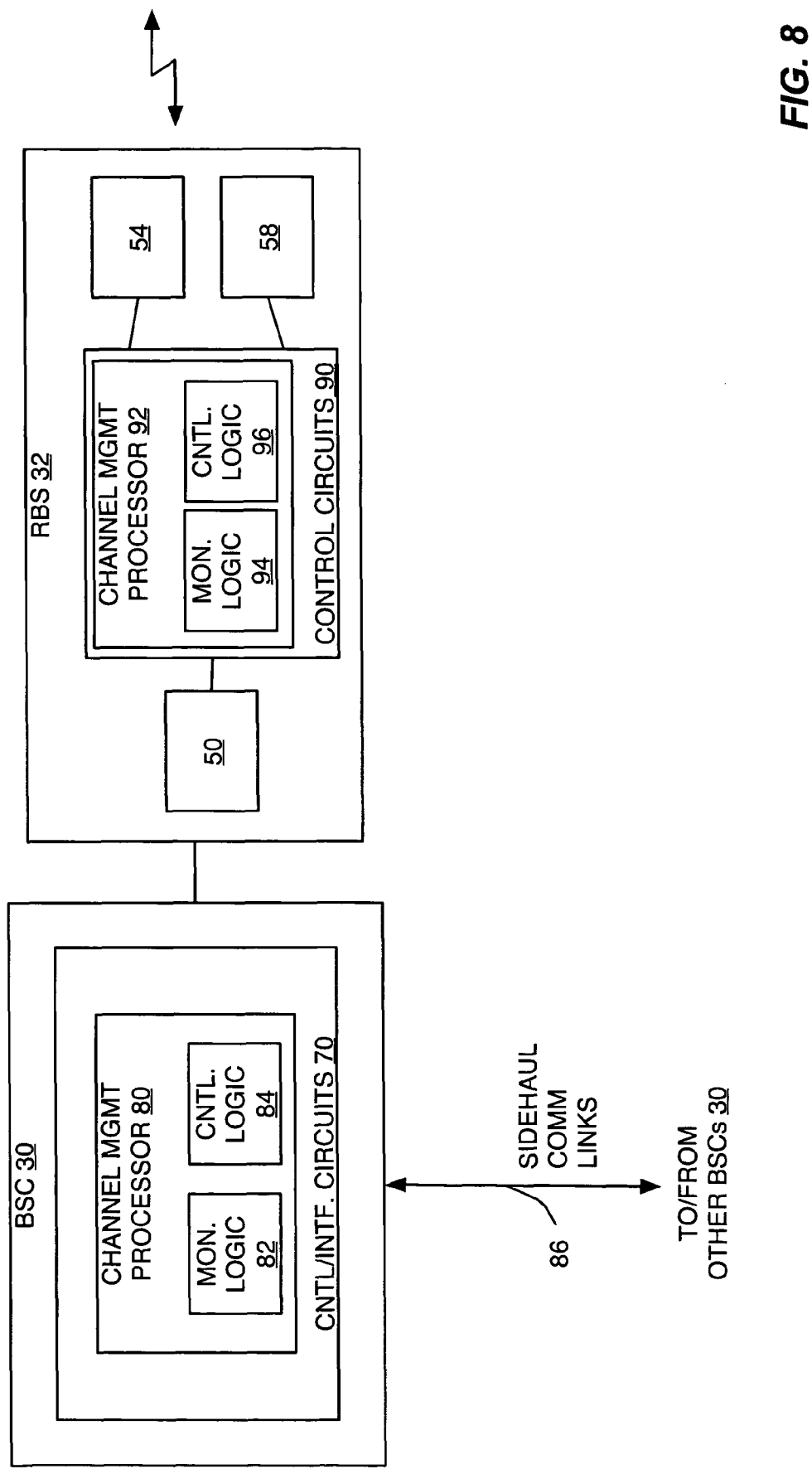
FIG. 8 is a diagram of an exemplary base station system for carrying out rate and resource management according to an embodiment of the present invention.

Turning to the next drawing, FIG. 8 illustrates an exemplary base station system for carrying out the above rate and resource management that comprises exemplary embodiments of BSC 30 and RBS 32. Here, BSC 30 comprises the previously illustrated control and interface circuits 70, which may be configured with a channel management processor 80, that includes monitoring logic 82 and control logic 84. RBS 32 comprises the previously illustrated interface circuits 50, transmit and receive circuits 54 and 58, and further includes exemplary control circuits 90. Control circuits 90 may be configured to carry out the processing logic associated with the previously illustrated forward and reverse link signal processing circuits 52 and 56, including rate adaptor circuit 60. More particularly, control circuits 90 include one or more processing circuits 90 that may be configured to include monitoring logic 94 and control logic 96.

It should be understood that all such illustrations may be functional circuit arrangements, rather than physical circuit arrangements, and that the control and processing logic elements illustrated in FIG. 8 for BSC 30 and RBS 32 may be implemented in hardware, software, or in any combination thereof. Regardless, the channel management processor 80 of BSC 30 and/or the channel management processor 92 of RBS 32 may be configured to carry out exemplary combined channel rate adaptation and channel resource allocation adjustments in accordance with the above exemplary details.

For example, it may be advantageous to carry out rate adaptation at the RBS 32, and to carry out resource allocation adjustments at the BSC 30. Of course, RBS 32 could be configured to provide BSC 30 with the information needed to carry out both rate adaptation and resource allocation adjustments at the BSC 30. Supporting information could be provided to BSC 30 by RBS 32 by backhaul signaling, such as where RBS 32 provides BSC 30 with ongoing channel condition information, and, possibly, resource availability information.

Figure 10:
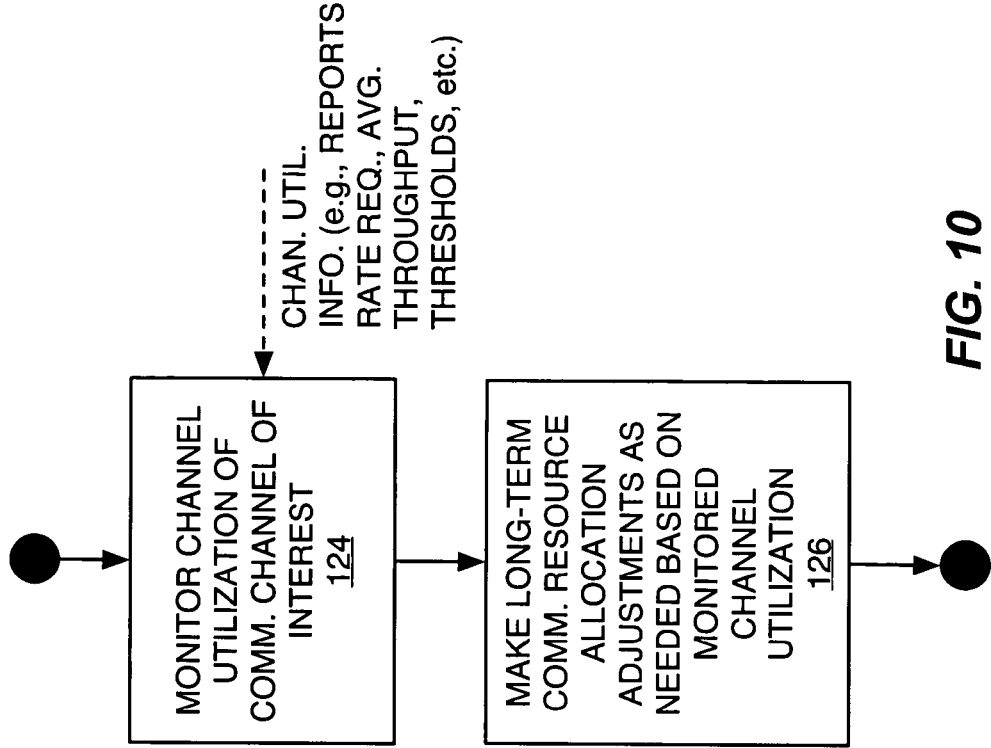
FIGS. 9, 10, and 11 are diagrams of exemplary processing logic for communication channel management according to various embodiments of the present invention.
Figure 9:
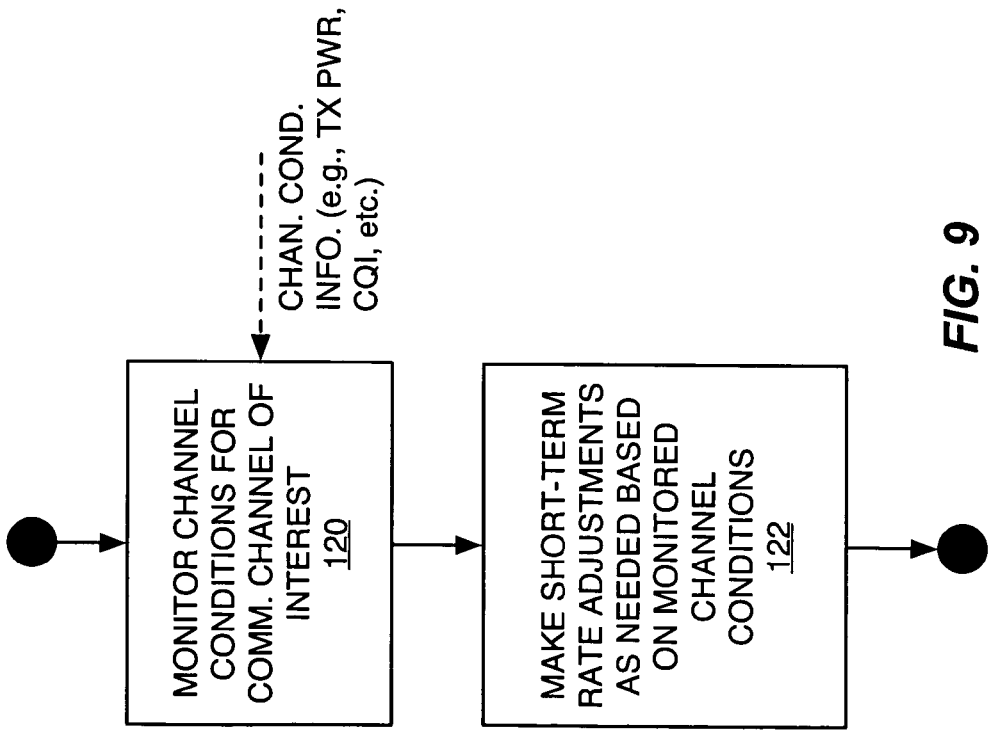

Regardless of these implementation details, which may vary according to actual BSC/RBS architecture, FIGS. 9 and 10 illustrate exemplary processing logic for communication channel management according to the present invention. More particularly, FIG. 9 illustrates monitoring ongoing channel conditions (Step 120), and making corresponding "short-term" data rate adjustments as needed based on the monitored conditions (Step 122). Here, "short-term" denotes a relative time scale in the sense that the data rate adjustments are made quickly enough to track relatively rapid changes in prevailing channel conditions, e.g., once per frame as needed, and in the sense that the rate at which such data rate adaptations can be made is faster than the rate at which channel resource allocation adjustments are made.

On that point, FIG. 10 illustrates exemplary processing logic for resource allocation adjustments that comprises monitoring ongoing channel utilization of the communication channel of interest (Step 124), and making corresponding "long-term" communication resources adjustments as needed, based on the monitored utilization (Step 126). Here, "long-term" denotes that a current resource allocation is maintained over one or more rate adaptations, and thus allocation adjustments are, in general, made less frequently than rate adaptations for a given communication channel of interest.

As noted, the allocated resources may be reduced if the channel is underutilized and may be increased if the channel is over-utilized, e.g., increased if the channel is highly utilized relative to its current configuration/allocation. For a given current channel resource allocation, one or more utilization thresholds may be defined. For example, the maximum data throughput achievable with the given current resource allocation may be used as a reference for defining an underutilization threshold, say forty-percent of the maximum, and as a reference for defining an over-utilization threshold, say ninety-percent. By allocating more resources to the highly utilized channels, the network increases its efficiency (and throughput) by exploiting the good radio links in the system.

Figure 11:
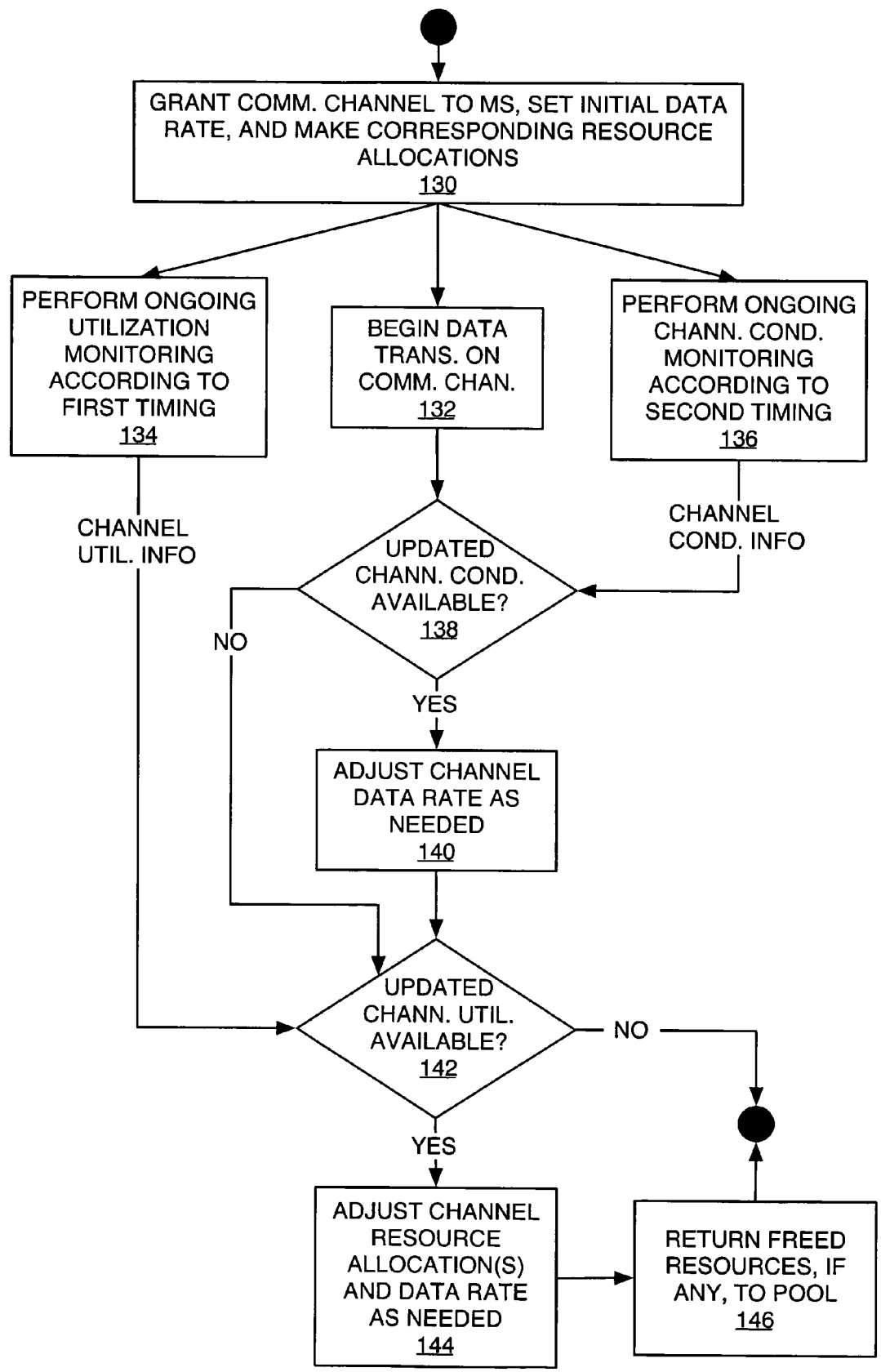

With such details in mind, FIG. 11 "marries" together the exemplary processing logic of FIGS. 9 and 10, and provides additional exemplary information regarding the coordinated timing of rate adaptation and resource allocation adjustments. Here, processing begins with the exemplary base station system granting a variable data rate communication channel to a given mobile station 14, which includes setting the initial channel data rate and making the correspondingly appropriate communication resource allocations (Step 130).

Once the channel is granted, the exemplary base station system begins data transmission to the mobile station 14 on the channel as needed (Step 132), and in conjunction with ongoing data transmission, it performs ongoing channel utilization monitoring (Step 134), and ongoing channel condition monitoring (Step 136). Here, the "term" ongoing does not necessarily connote continuous data transmission on the channel.

Channel utilization monitoring may be based on first timing, which may comprise setting an adjustment interval as a function of filtering actual data throughput values for the channel to obtain a smoothed, average data throughput value for control purposes. Depending on the filtering used, an updated average data throughput may be available once per a given number of transmit frames. In support of maintaining an estimate of average data throughput for the channel, the base station system may maintain a timer that has an expiration period that spans a desired number of transmit frames, and that may be used to trigger the process of re-allocating communication resources as needed at a defined, periodic interval.

Similarly, channel condition monitoring may be configured as a regularly timed operation carried out according to second timing, which preferably is faster than the first timing. Again, the filtering process used to obtain filtered power measurements and/or filtered CQI values may define how frequently updated channel condition information is available and, as with resource allocation adjustment timing, a timer process may be configured to trigger data rate adaptation evaluations at regularly timed intervals.

Thus, if updated channel condition information is available and/or if the rate adaptation timer has elapsed (Step 138), exemplary processing continues with an evaluation of whether channel rate adaptation is desirable given the currently prevailing channel conditions (Step 140). Processing continues with a determination of whether updated channel utilization information is available and/or if the resource allocation adjustment timer has elapsed (Step 142), exemplary processing continues with an evaluation of whether channel rate adaptation is desirable given the current level of channel utilization relative to the current resource allocation (Step 144). Note that if a resource re-allocation is performed wherein the resource allocation is reduced, the freed resources preferably are returned to the available resource pool, or pools, for reassignment to other communication channels as needed (Step 146).

FIG. 11 thus depicts an exemplary method in accordance with the present invention, wherein a variable data rate communication channel is managed, both in terms of its data rate and in terms of its corresponding resource allocations. In the short-term, the channel's data rate may be increased or decreased as needed for varying channel conditions. Preferably, the channel's allocated resources are maintained over these short-term rate adjustments. Then, over the longer-term, the exemplary method ensures that allocated resources are being efficiently utilized by determining whether the channel's current resource allocation is appropriate given the actual utilization of the channel. Resources may be added or taken away as appropriate.

As noted, the present invention has particular applicability to F-SCH rate adaptation in cdma2000 networks, but those skilled in the art will recognize that the present invention can be applied to essentially any type of communication channel in any type of network where adaptive rate control is desired. As such, the present invention is not limited by the foregoing discussion, but rather is limited only by the following claims and their reasonable equivalents.

What is claimed is:

1. In a base station for use in a wireless communication network, a method of managing a communication channel having a variable data rate comprising:
   making short-term data rate adjustments for the communication channel based on monitoring changing channel conditions on a first time scale; and
   making long-term communication resource allocation adjustments for the communication channel based on monitoring channel utilization on a second time scale slower than said first time scale.

2. The method of claim 1, wherein making short-term data rate adjustments for the communication channel based on monitoring changing channel conditions on a first time scale comprises monitoring changing channel conditions by monitoring an average transmit power being used to transmit the communication channel at a current data rate to a remote receiver, increasing the current data rate if the average transmit power is relatively low in comparison to a transmit power allocation, and decreasing the current data rate if the average transmit power is relatively high in comparison to the transmit power allocation.

3. The method of claim 2, further comprising tracking the current transmit power on a per transmit frame basis, averaging the per-frame transmit power values to obtain the average transmit power, comparing the average transmit power to a minimum transmit power allocation defined for the communication channel as a basis for increasing the current data rate, and comparing the average transmit power to a maximum transmit power allocation defined for the communication channel as a basis for decreasing the current data rate.

4. The method of claim 1, wherein making long-term communication resource allocation adjustments for the communication channel based on monitoring channel utilization on a second time scale slower than said first time scale comprises comparing an average data throughput of the communication channel to a maximum data throughput corresponding to a current data rate of the communication channel, or to rate requests received for the channel, as a basis for determining whether the communication channel is underutilized or over-utilized.

5. The method of claim 4, wherein, if the communication channel is underutilized, making long-term communication resource allocation adjustments for the communication channel based on monitoring channel utilization comprises decreasing the communication resource allocation.

6. The method of claim 4, wherein, if the communication channel is over-utilized, making long-term communication resource allocation adjustments for the communication channel based on monitoring channel utilization comprises increasing the communication resource allocation.

7. The method of claim 4, wherein making long-term communication resource allocation adjustments for the communication channel on a second time scale slower than said first time scale comprises decreasing the communication resource allocation for the communication channel if the communication channel is being underutilized, and increasing the communication resource allocation for the communication channel if the communication channel is being over-utilized.

8. In a base station, a method of managing a variable data rate communication channel in a wireless communication network comprising:
   changing a communication resource allocation for the communication channel responsive to monitoring a channel utilization of the communication channel on a first time scale; and
   for a current communication resource allocation, changing a data rate of the communication channel responsive to monitoring channel conditions on a second time scale faster than said first time scale.

9. The method of claim 8, wherein changing a communication resource allocation for the communication channel responsive to monitoring a channel utilization of the communication channel on a first time scale comprises reducing the current communication resource allocation responsive to determining that an average data throughput for the communication channel is below a lower utilization threshold.

10. The method of claim 9, further comprising making any communication resources freed by reducing the current communication resource allocation available for re-allocation to other communication channels as needed.

11. The method of claim 8, wherein changing a communication resource allocation for the communication channel responsive to monitoring a channel utilization of the communication channel on a first time scale comprises increasing the current communication resource allocation responsive to determining that an average data throughput for the communication channel is above an upper utilization threshold.

12. The method of claim 8, wherein, for a current communication resource allocation, changing a data rate of the communication channel responsive to monitoring channel conditions on a second time scale faster than said first time scale comprises lowering the data rate if an average transmit power of the communication channel is close to a maximum transmit power allocation defined by the current communication resource allocation, and increasing the data rate if the average transmit power of the communication channel is close to a minimum transmit power allocation defined by the current communication resource allocation.

13. The method of claim 8, wherein, for a current communication resource allocation, changing a data rate of the communication channel responsive to monitoring channel conditions on a second time scale faster than said first time scale comprises increasing or decreasing the data rate of the communication channel responsive to channel quality information returned by a mobile station receiving the communication channel.

14. The method of claim 8, wherein changing a communication resource allocation for the communication channel comprises changing a transmit power allocation for the communication channel.

15. The method of claim 8, wherein changing a communication resource allocation for the communication channel comprises changing a spreading code allocation for the communication channel.

16. The method of claim 8, wherein the data rate is adjusted one or more times as needed based on the second time scale, while the current communication resource allocation is maintained for the first time scale.

17. In a base station for use in a wireless communication network, a method of managing a communication channel having a variable data rate comprising:

initially allocating communication resources to the communication channel in accordance with an initial data rate set for the communication channel;

changing the data rate responsive to monitoring channel conditions on a first time scale, while retaining the allocated communication resources; and re-allocating communication resources to the communication channel responsive to monitoring channel utilization on a second time scale slower than said first time scale.

18. The method of claim 17, further comprising returning any communication resources freed by the re-allocation to one or more available resource pools for use as needed in supporting other communication channels.

19. The method of claim 17, wherein the first time scale is referenced to a transmit frame timing of the communication channel, and wherein the second time scale is referenced to a periodically generated channel rate report message corresponding to the communication channel.

20. The method of claim 17, further comprising managing the communication channel via sidehaul links established between base station systems based on passing management messages between the base station systems.

21. The method of claim 17, wherein initially allocating communication resources to the communication channel in accordance with an initial data rate set for the communication channel comprises setting a maximum transmit power to be used for transmitting the communication channel.

22. The method of claim 21, wherein changing the data rate responsive to monitoring channel conditions on a first time scale, while retaining the allocated communication resources comprises increasing and decreasing the data rate as a function of determining whether an average transmit power being used for the communication channel is relatively high or relatively low in comparison to the maximum transmit power, said average transmit power being indicative of channel conditions.

23. The method of claim 17, wherein re-allocating communication resources to the communication channel responsive to monitoring channel utilization on a second time scale slower than said first time scale comprises determining whether an average channel throughput is relatively high or low in comparison to a maximum possible channel throughput corresponding to the currently allocated communication resources, or in comparison to rate request feedback received for the communication channel, and increasing or decreasing the allocated communication resources in response thereto.

24. The method of claim 23, further comprising determining the average channel throughput based on periodically generated rate report messages that identify a data throughput rate for the communication channel.

25. A base station for use in a wireless communication network comprising a control circuit including one or more processing circuits configured to:

initially allocate communication resources to the communication channel in accordance with an initial data rate set for the communication channel;

change the data rate responsive to monitoring channel conditions on a first time scale, while retaining the allocated communication resources; and re-allocate communication resources to the communication channel responsive to monitoring channel utilization on a second time scale that is slower than said first time scale.

26. The base station of claim 25, wherein the control circuit is configured to return any communication resources freed by the re-allocation to one or more available resource pools for use as needed in supporting other communication channels.

27. The base station of claim 25, wherein the first time scale is referenced to a transmit frame timing of the communication channel, and wherein the second time scale is referenced to a periodically generated channel rate report message corresponding to the communication channel.

28. The base station of claim 25, further comprising managing the communication channel via sidehaul links established between base station systems based on passing management messages between the base station systems.

29. The base station of claim 25, wherein initially allocating communication resources to the communication channel in accordance with an initial data rate set for the communication channel comprises setting a maximum transmit power to be used for transmitting the communication channel.

30. The base station of claim 29, wherein changing the data rate responsive to monitoring channel conditions on a first time scale, while retaining the allocated communication resources comprises increasing and decreasing the data rate as a function of determining whether an average transmit power being used for the communication channel is relatively high or relatively low in comparison to the maximum transmit power, said average transmit power being indicative of channel conditions.

31. The base station of claim 25, wherein re-allocating communication resources to the communication channel responsive to monitoring channel utilization on a second time scale slower than said first time scale comprises determining whether an average channel throughput is relatively high or low in comparison to a maximum possible channel throughput corresponding to the currently allocated communication resources, or in comparison to rate request feedback received for the communication channel, and increasing or decreasing the allocated communication resources in response thereto.

32. The base station of claim 31, further comprising determining the average channel throughput based on periodically generated rate report messages that identify a data throughput rate for the communication channel.

* * * * *

UNITED STATES PATENT AND TRADEMARK OFFICE
CERTIFICATE OF CORRECTION

| | | |
|---|---|---|
| PATENT NO. | : 7,808,952 B2 | Page 1 of 1 |
| APPLICATION NO. | : 10/865154 | |
| DATED | : October 5, 2010 | |
| INVENTOR(S) | : Duan et al. | |

It is certified that error appears in the above-identified patent and that said Letters Patent is hereby corrected as shown below:

In Column 2, Line 19, delete "cdma20000" and insert -- cdma2000 --, therefor.

Signed and Sealed this
Sixteenth Day of August, 2011

David J. Kappos
*Director of the United States Patent and Trademark Office*